(12) United States Patent
Chen et al.

(10) Patent No.: US 11,659,424 B2
(45) Date of Patent: *May 23, 2023

(54) SELECTIVE PROVIDING OF A TRANSITION RECOMMENDATION BASED ON RESPONSE HISTORY

(71) Applicant: ARRIS Enterprises LLC, Suwanee, GA (US)

(72) Inventors: Wen Chen, San Jose, CA (US); Raghavendra Sadaramachandra, Sunnyvale, CA (US)

(73) Assignee: ARRIS ENTERPRISE, LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,130

(22) Filed: Jan. 24, 2022

(65) Prior Publication Data

US 2022/0150735 A1 May 12, 2022

Related U.S. Application Data

(63) Continuation of application No. 17/004,630, filed on Aug. 27, 2020, now Pat. No. 11,240,691.
(Continued)

(51) Int. Cl.
  *H04W 24/08* (2009.01)
  *H04W 28/06* (2009.01)
  *H04W 84/12* (2009.01)

(52) U.S. Cl.
  CPC .......... *H04W 24/08* (2013.01); *H04W 28/06* (2013.01); *H04W 84/12* (2013.01)

(58) Field of Classification Search
  CPC ..... H04W 24/02; H04W 24/10; H04W 28/06; H04W 24/08; H04W 36/0085; H04W 36/22
  See application file for complete search history.

(56) References Cited

U.S. PATENT DOCUMENTS

2007/0015509 A1* 1/2007 Xiang .................. H04W 36/24
                                                            455/436
2010/0046546 A1    2/2010 Ram et al.
(Continued)

FOREIGN PATENT DOCUMENTS

WO         2015089490 A1    6/2015

OTHER PUBLICATIONS

International Search Report and the Written Opinion of the International Searching Authority corresponding to International Patent Application No. PCT/US2020/047860 (11 pages) (dated Nov. 27, 2020).

*Primary Examiner* — Syed Ali
(74) *Attorney, Agent, or Firm* — Steven Stupp; Stewart Wiener

(57) ABSTRACT

During operation, an access point compares a communication performance metric of the access point and a parameter corresponding to communication performance metrics of one or more second access points. For example, the access point may determine the communication performance metric based on communication with one or more electronic devices and/or may receive information specifying the communication performance metrics of the one or more second access points. Then, the access point selectively provides a recommendation for a first connected electronic device in the one or more electronic devices based at least in part on the comparison and a history of responses of at least the first connected electronic device to one or more previous recommendations, where the recommendation indicates that the first connected electronic device, which is associated with the access point, transition to a different communication channel.

20 Claims, 10 Drawing Sheets

Related U.S. Application Data

(60) Provisional application No. 62/892,706, filed on Aug. 28, 2019.

(56) References Cited

U.S. PATENT DOCUMENTS

| | | | |
|---|---|---|---|
| 2012/0202498 A1* | 8/2012 | Sachs | H04W 28/16 455/436 |
| 2014/0162680 A1* | 6/2014 | Kotecha | H04W 28/0819 455/453 |
| 2014/0283029 A1* | 9/2014 | Chandrasekaran | H04L 63/14 726/22 |
| 2015/0358990 A1 | 12/2015 | Kovacs et al. | |
| 2016/0007278 A1* | 1/2016 | Gupta | H04W 76/10 370/329 |
| 2016/0036657 A1 | 2/2016 | Ardeli et al. | |
| 2017/0034832 A1 | 2/2017 | Karimli et al. | |
| 2017/0134255 A1* | 5/2017 | Amini | H04L 45/20 |
| 2017/0238227 A1 | 8/2017 | Ponnuswamy | |
| 2019/0320385 A1 | 10/2019 | Bhartia et al. | |

* cited by examiner

SELECTIVE PROVIDING OF A TRANSITION RECOMMENDATION BASED ON RESPONSE HISTORY

CROSS REFERENCE TO RELATED APPLICATIONS

This application is a continuation of U.S. Non-Provisional application Ser. No. 17/004,630, "Selective Providing of a Transition Recommendation Based on Response History," by Wen Chen et al., filed on Aug. 27, 2020, which claims priority under 35 U.S.C. 119(e) to: U.S. Provisional Application Ser. No. 62/892,706, "Selective Providing of a Transition Recommendation Based on Response History," filed on Aug. 28, 2019, by Wen Chen, of al, the contents of both of which are herein incorporated by reference.

This application includes subject matter related to U.S. patent application Ser. No. 16/426,619, "Load Balancing Among Bands and Access Points in a Wireless Network," by Wen Chen, et al., filed on May 30, 2019, and to U.S. patent application Ser. No. 16/428,089, "Collaborative Determination of Wireless Signal Strength by Access Points," by Wen Chen, et al, filed on May 31, 2019, the contents of both of which are herein incorporated by reference.

BACKGROUND

Field

The described embodiments relate to techniques for communicating information among electronic devices, including load balancing of electronic devices among access points and bands of frequencies during wireless communication in a wireless local area network.

Related Art

Many electronic devices are capable of wirelessly communicating with other electronic devices. For example, these electronic devices can include a networking subsystem that implements a network interface for: a cellular network (UMTS, LTE, etc.), a wireless local area network or WLAN, e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

In a wireless network based on an IEEE 802.11 standard, an electronic device often actively scans for a nearby operating access point by transmitting a probe request. However, in a crowded wireless environment, there may be multiple access points within communication range of the electronic device. Consequently, the electronic device may associate with an access point that has interior performance to another of the available access points. Moreover, one or more of the access points may become overloaded, e.g., an access point may experience a higher load or may provide reduced quality and/or speed of service to the electronic device than the other access points.

In order to address these problems, many existing access points implement load balancing techniques. For example, during load balancing, an access point may reject an electronic device and cause it to associate with a different access point. However, existing load balancing techniques often result in random and sub-optimal communication performance in a WLAN.

SUMMARY

An access point that selectively provides a recommendation, e.g., during dynamic load balancing, is described. This access point includes: a network node; an antenna node that couples to an antenna; and an interface circuit. The interface circuit may communicate using wireless communication with one or more electronic devices in a WLAN, and may communicate using wired or wireless communication, with one or more second access points. During operation, the access point may compare a communication performance metric of the access point and a parameter corresponding to communication performance metrics of the one or more second access points. Based at least in part on the comparison and a history of responses of at least a first connected electronic device of the one or more electronic devices to one or more previous recommendations, the access point may selectively provide the recommendation to the first connected electronic device, and the recommendation may indicate that the first connected electronic device, which is associated with the access point, transition to a different communication channel (such as a communication channel that has a lighter load and can provide better communication quality).

Moreover, the access point may communicate one or more packets or frames to and/or from the one or more electronic devices, and may optionally coordinate one or more second access points to observe this communication. Then, the access point and optionally the one or more second access points may determine their respective communication performance metric with respect to the first connected electronic device based at least in part on the communicated one or more packets or frames. Furthermore, the access point may receive one or more second messages from the one or more second access points, where the one or more second messages include the respective communication performance metrics between the one or more second access points and the first connected electronic device.

Additionally, the communication performance metric of the access point and/or a given one of the communication performance metrics of the one or more second access points may include an available capacity.

In some embodiments, the access point may provide one or more second messages to the one or more second access points, where the one or more second messages include the determined available communication performance metric of the access point.

Note that the access point may use a ranking system to selectively provide the recommendation to the first connected electronic device, which may be highly ranked. The rank may increase as a data rate or throughput associated with the first connected electronic device decreases, as a traffic demand associated with the first connected electronic device increases, or a signal-to-noise ratio or a signal strength (such as an RSSI) associated with the first connected electronic device decreases.

Moreover, the selective providing of the recommendation may be based at least in part on a weight corresponding to the history of responses. Notably, the access point may determine the weight based at least in part on the history of responses, and the weight may increase as a number of times the first connected electronic device declined the one or more previous recommendations increases. Alternatively or additionally, the weight may increase as a data rate or throughput associated with the first electronic device decreases, as a traffic demand associated with the first electronic device increases, or a signal-to-noise ratio or a signal strength (such as an RSSI) associated with the first electronic device decreases Note that this weight calculation may give an electronic device that recently declined a recommendation a higher weight than it received previously.

When the weight is higher than that of its peers, an electronic device may not be selected to receive recommendation. Moreover, when the weight is less than a first threshold, the recommendation may be selectively provided. Alternatively, when the weight is greater than the first threshold and less than a second threshold, the recommendation may be selectively provided along with a warning to encourage acceptance of the recommendation. For example, the warning may indicate that the first connected electronic device is about to be disassociated from the access point. In some embodiments, when the weight is greater than the second threshold, the electronic device may not provide the recommendation. Instead, the access point may disassociate from the first connected electronic device.

Furthermore, the access point may provide information indicating that the access point is associated with the first connected electronic device to at least a second access point in the one or more second access points. (This information may be provided in response to a request from the second access point.) In response, the access point may receive a notification from the second access point that indicates a timestamp when the first connected electronic device transitioned from the second access point. In these embodiments, the selective providing of the recommendation may be based at least in part on the timestamp. For example, when an elapsed time since the timestamp is less than a time interval, the access point may not provide the recommendation.

Note that the channel may be associated with the access point or one of the one or more second access points.

Additionally, the recommendation may be selectively provided using a basic service set transition management (BTM) protocol. Alternatively, when the first connected electronic device does not support the BTM protocol, the access point may disassociate from the first connected electronic device.

In some embodiments, the parameter may include a headroom value plus a moment of a distribution of the communication performance metrics of the one or more second access points (such as an average or a median of available capacity metrics of the one or more second access points).

Moreover, prior to selectively providing the recommendation, the access point may identify at least the first connected electronic device based at least in part on one or more communication performance metrics associated with at least a subset of the one or more electronic devices. For example, the one or more communication performance metrics associated with at least the subset of the one or more electronic devices may include: a data rate, a received signal strength indicator, and/or a total data volume during a time interval. Moreover, identifying at least the first connected electronic device may involve: normalizing the one or more communication performance metrics associated with at least the subset of the one or more electronic devices, calculative distance metrics of at least the subset of the one or more electronic devices based at least in part on the normalized one or more communication performance metrics associated with at least the subset of the one or more electronic devices, and/or ranking at least the subset of the one or more electronic devices based at least in part on the calculated distance metrics. In some embodiments, the access point may identify the first connected electronic device based at least in part on information included in a packet or frame received from the first connected electronic device, such as a Media. Access Control (MAC) address and its Organizationally Unique Identifier (OUI) in a MAC header. The access point may store information that specifies the identity of the first connected electronic device with the history of responses associated with the first connected electronic device.

Furthermore, prior to selectively providing the recommendation, the access point may provide requests for beacon reports to the one or more electronic devices, and may receive the beacon reports from at least a second subset of the one or more electronic devices. The selective providing of the recommendation may be based at least in part on the beacon reports received from at least the second subset of the one or more electronic devices, which may include the first connected electronic device. Note that a given beacon report may include information specifying one or more of the second access points with which a given electronic device in the one or more electronic devices communicates using wireless communication. Thus, the selective providing of the recommendation may be based at least in part on communication performance at the first connected electronic device.

Another embodiment provides the second access point that performs counterpart operations to at least some of the aforementioned operations.

Another embodiment provides a computer-readable storage medium for use with the access point. When executed by the access point, this computer-readable storage medium causes the access point to perform at least some of the aforementioned operations.

Another embodiment provides a method, which may be performed by the access point. This method includes at least some of the aforementioned operations.

Another embodiment provides a second method for performing load balancing in a wireless local area network (WLAN), which may be performed by an access point. During operation, the access point may identify an electronic device that is associated with the access point in the WLAN as a candidate for transitioning to a different communication channel. Then, the access point may selectively transmit a recommendation that the identified electronic device transition to the different communication channel based at least in part on a history of responses of the electronic device to one or more previous recommendations to transition to one or more different communication channels.

Note that the selectively transmitting the recommendation may be based at least in part on a weight that is determined by the access point that corresponds to the history of responses of the electronic device. Moreover, identifying the electronic device that is associated with the access point may involve comparing a communication performance metric of the access point to a parameter corresponding to communication performance metrics of one or more second access points in the WLAN.

Another embodiment provides the access point that performs the operations in the second method.

Another embodiment provides a computer-readable storage medium for use with the access point. When executed by the access point, this computer-readable storage medium causes the access point to perform at least some of the aforementioned operations in the second method.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
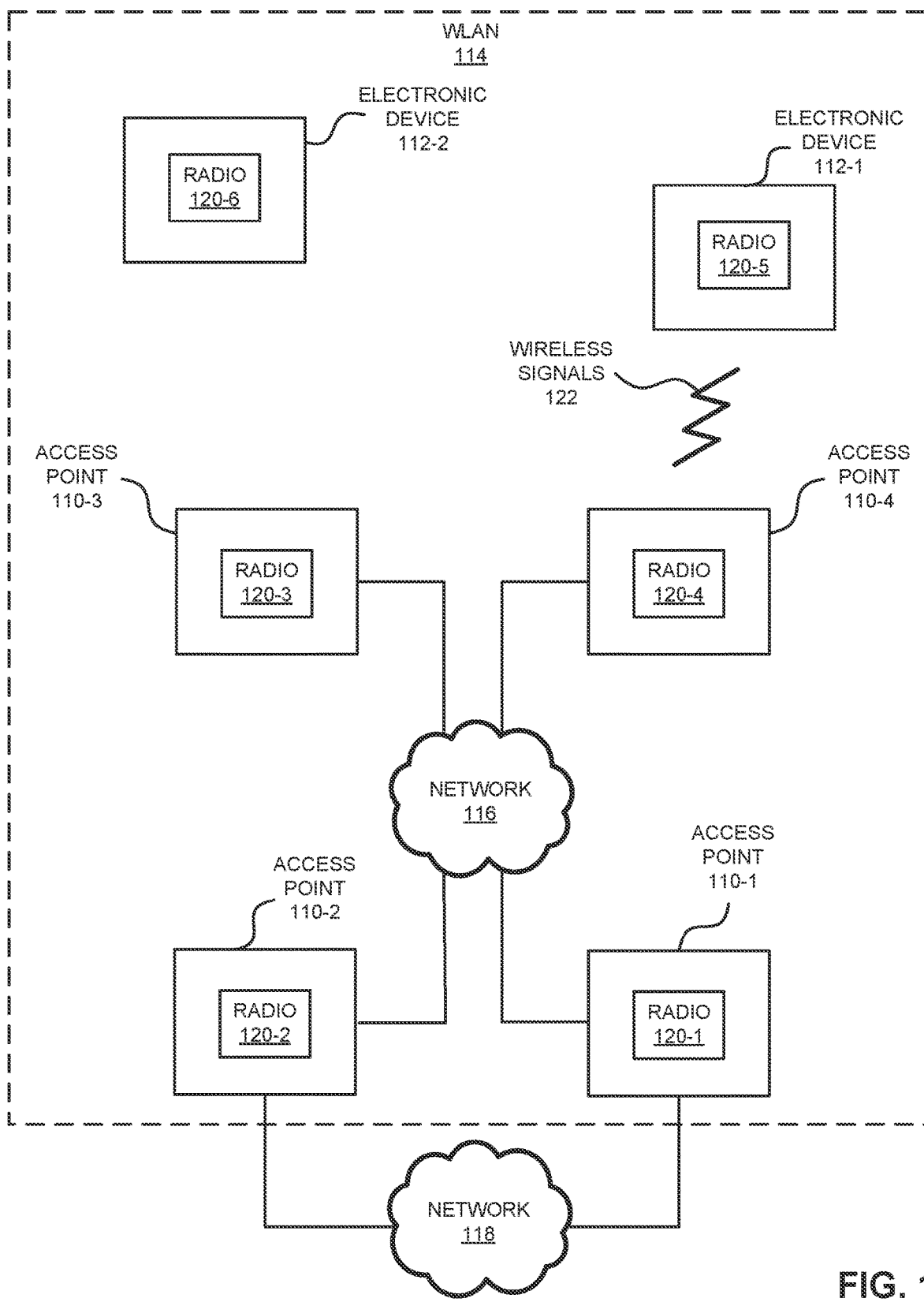
FIG. 1 is a block diagram illustrating communication among access points and electronic devices in a subnet in accordance with an embodiment of the present disclosure.

An access point that selectively provides dynamic (e.g., real-time) load balancing is described. During operation, this access point may compare a communication performance metric of the access point and a parameter corresponding to communication performance metrics of one or more second access points. For example, the access point may determine the communication performance metric based on communication with one or more electronic devices and/or may receive information specifying the communication performance metrics of the one or more second access points. Then, the access point may selectively provide a recommendation for a first connected electronic device in the one or more electronic devices based at least in part on the comparison and a history of responses of at least the first connected electronic device to one or more previous recommendations, where the recommendation indicates that the first connected electronic device, which is associated with the access point, transition to a different communication channel.

By selectively providing the recommendation (and, thus, selectively providing dynamic load balancing), this communication technique may provide improved communication performance (such as improved throughput, capacity, load balancing and robust communication) when using the access point, the one or more second access points and the one or more electronic devices. Moreover, the communication technique may allow the access point to adapt the selective providing of the recommendation, e.g., based at least in part on the history of responses. This may increase the probability that the first connected electronic device accepts the recommendation when it is selectively provided. Furthermore, the selective providing of the recommendation may reduce the frequency of transitions for the first connected electronic device, so that the first connected electronic device does not repeatedly switch back and forth or "ping pong" between the access point and the one or more second access points. Consequently, the communication technique may improve the user experience when using a WLAN.

In the discussion that follows, the electronic device and the access point communicate packets in accordance with a wireless communication protocol, such as an Institute of Electrical and Electronics Engineers (IEEE) 802.11 standard (which is sometimes referred to as "Wi-Fi" from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols (such as Long Term Evolution or LTE, another cellular-telephone communication protocol, etc.) may be used. The wireless communication may occur in a 2.4 GHz, 5 GHz and/or a 60 GHz frequency band. (Note that IEEE 802.11ad communication over a 60 GHz frequency band is sometimes referred to as 'WiGig.' In the present discussion, these embodiments are also encompassed by 'Wi-Fi.')

Moreover, the access point may communicate with other access points and/or computers in the WLAN using a wireless or a wired communication protocol, such as IEEE 802.11, an IEEE 802.3 standard (which is sometimes referred to as 'Ethernet') and/or another type of wired or wireless interface. In the discussion that follows, Ethernet is used as an illustrative example of communication between the access point and the one or more second access points in the WLAN.

FIG. 1 presents a block diagram illustrating an example of communication among one or more access points 110 and electronic devices 112 (such as a cellular telephone, and which are sometimes referred to as 'clients') in a WLAN 114 in accordance with some embodiments. Access points 110 may communicate with each other in WLAN 114 using wireless and/or wired communication (such as by using Ethernet or a communication protocol that is compatible with Ethernet). Moreover, one or more of access points 110 may have specific functions in WLAN 114, such as functioning as a gateway that provides access to network 118 (such as the Internet, a cable network, a cellular-telephone network, etc.), e.g., to communicate with an optional remote controller of access points 110. (However, in some embodiments, a controller may be located locally in WLAN 114.) Note that access points 110 may include a physical access point and/or a virtual access point that is implemented in software in an environment of an electronic device or a computer. In addition, at least some of access points 110 (such as access points 110-3 and 110-4) may communicate with electronic devices 112 using wireless communication.

The wired and/or wireless communication among access points 110 in WLAN 114 may occur via network 116 (such as an intra-net, a mesh network, point-to-point connections and/or the Internet) and may use a network communication protocol, such as Ethernet. Network 116 may include one or more routers and/or switches (not shown). Furthermore, the wireless communication using Wi-Fi may involve access points 110 and electronic devices 112: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wired and/or wireless communication among access points 110 also involves the use of dedicated connections, such as via a peer-to-peer (P2P) communication technique. Therefore, access points 110 may support wired communication within WLAN 114 (such as Ethernet) and wireless communication within WLAN 114 (such as Wi-Fi), and one or more of access points 110 may also support a wired communication protocol for communicating via network 118 (such as Ethernet, a cable modem communication protocol or LTE backhaul to a cellular-telephone network core).

Figure 10:
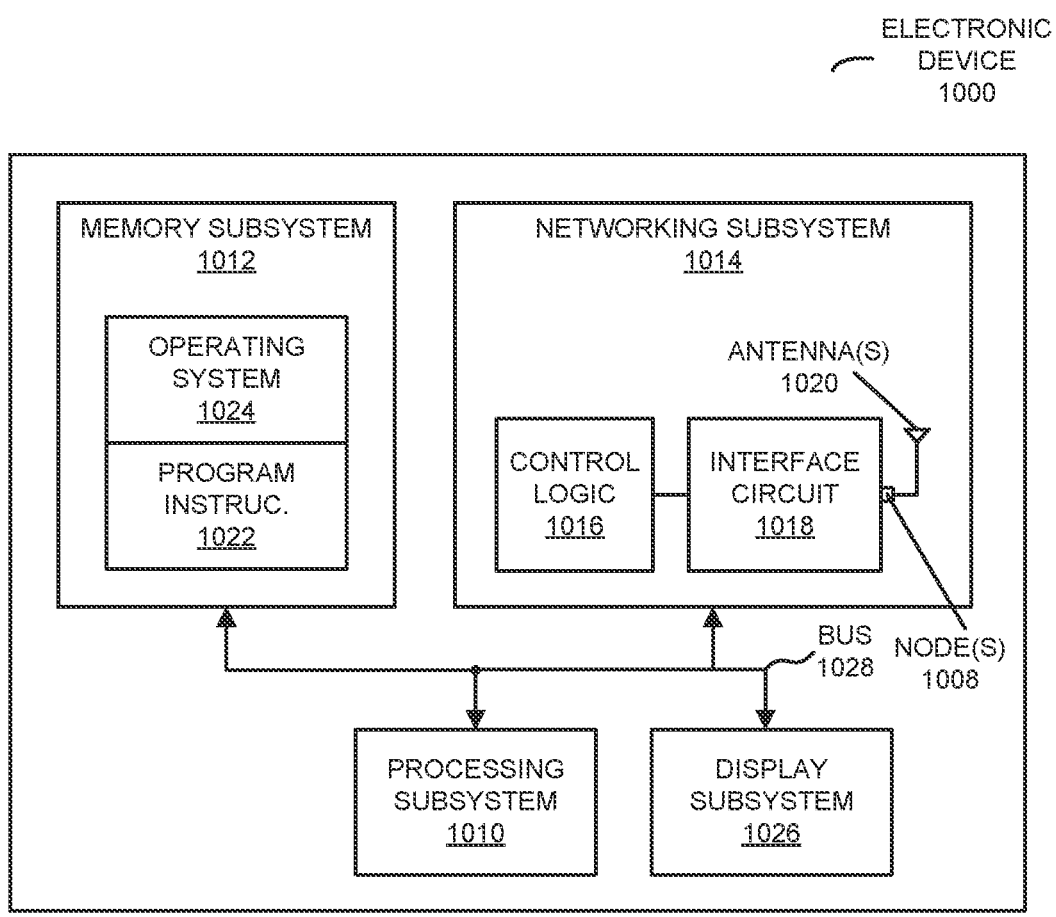
FIG. 10 is a block diagram illustrating an electronic device in accordance with an embodiment of the present disclosure.

As described further below with reference to FIG. 10, access points 110 and/or electronic devices 112 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-4 in access point 110-4. These wireless signals may be received by radio 120-5 in electronic device 112-1. Notably, access point 110-4 may transmit packets. In turn, these packets may be received by electronic device 112-1. Moreover, access point 110-4 may allow electronic device 112-1 to communicate with other electronic devices, computers and/or servers via networks 116 and/or 118.

Note that the communication among access points 110 and/or with electronic devices 112 may be characterized by a variety of communication performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving signals (such as wireless signals 122) with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, depending on the activity in WLAN 114 and/or network 118, one or more of access points 110 can become overloaded, which can result in degraded communication performance within WLAN 114, and/or between WLAN 114 and network 118. Existing load balancing techniques often focus on balancing electronic devices 112 across bands of frequencies and access points 110 when electronic devices 112 connect or associate with access points 110. However, these load balancing techniques often do not maintain high-performance links or service quality (such as utilization, capacity and/or throughput), especially in high-density deployments. In addition, static load balancing techniques cannot adapt to changing wireless conditions in WLAN 114. As described further below with reference to FIGS. 2-9, in order to address these problems, access points 110 may implement one or more embodiments of a communication technique that performs dynamic load balancing.

Notably, as described further below with reference to FIGS. 2-4, a given one of access points 110 (such as access point 110-1) may communicate one or more packets or frames to and/or from the one or more electronic devices 112. Based at least on the communicated packets or frames, access point 110-1 may determine an available capacity metric of access point 110-1, such as the available capacity or the throughput. For example, in some embodiments, the throughput may be a number of good bytes that are communicated divided by a sum of an access time plus an airtime for transmit, an available capacity may be a difference of a maximum capacity and an average current capacity, and a maximum capacity may be a number of physical layer convergence protocol (PLCP) protocol data units (PPDUs) times an average number of good bytes that are communication divided by a sum of a product of a number of total bytes times and access time plus a maximum number of PPDUs times an airtime for transmit. Note that the available capacity metric of access point 110-1 may be associated with a band of frequencies, such as 2.4 or 5 GHz. In some embodiments, information used to determine the available capacity metric of access point 110-1 may be collected from a driver in radio 120-1 every, e.g., 15 s.

Then, access point 110-1 may provide one or more messages (e.g., in one or more second packets or frames that are unicast or broadcast) to the one or more second access points (such as a remainder of access points 110, e.g., access points 110-2, 110-3 and 110-4), where the one or more messages may include or specify the determined available capacity metric of access point 110-1. For example, the one or more messages may include a currently used capacity and a maximum capacity of access point 110-1, which may specify the available capacity of access point 110-1. Moreover, access point 110-1 may receive one or more second messages (e.g., in one or more third packets or frames that are unicast or broadcast) from the one or more second access points, where the one or more second messages may include or specify available capacity metrics of the one or more second access points. Note that the one or more second access points may include one or more neighboring access points of access point 110-1, and access point 110-1 may identify the one or more neighboring access points based at least in part on wireless ranges between the one or more neighboring access points and access point 110-1. In some embodiments, the one or more messages and the one or more second messages are communicated via network 116 using wired communication or in WLAN 114 using wireless communication.

Furthermore, access point 110-1 may compare the available capacity metric of access point 110-1 and a parameter corresponding to the available capacity metrics of the one or more second access points. For example, the parameter may include a headroom value (such as, e.g., 10%) plus a moment of a distribution of the available capacity metrics of the one or more second access points (such as an average or a median of the available capacity metrics). Note that the comparison may indicate that access point 110-1 is overloaded in the band of frequencies, such as when the available capacity metric of access point 110-1 is less than the parameter.

Based at least in part on the comparison, access point 110-1 may dynamically perform load balancing. For example, during the load balancing, access point 110-1 may selectively provide a recommendation to at least a first connected electronic device (such as electronic device 112-1) of the one or more electronic devices 112. The recommendation may indicate that electronic device 112-1 which is currently associated with access point 110-1, transition to a different communication channel. Note that, prior to the load balancing, communication with electronic device 112-1 may use at least the band of frequencies.

In some embodiments, the communication channel may be associated with one of the one or more second access points (and, thus, the recommendation may be that electronic device 112-1 disassociate, e.g., discontinue a connection with access point 110-1, and associate or establish a connection with one of the one or more second access points), or is in a second band of frequencies and is associated with access point 110-1 (e.g., the recommendation may be for electronic device 112-1 to transition from the band of frequencies to the second band of frequencies, but to remain associated with access point 110-1). In response to the recommendation, electronic device 112-1 may perform the transition to the different communication channel.

Furthermore, the recommendation may be selectively provided using a basic service set transition management (BTM) protocol. For example, access point 110-1 may provide the recommendation to electronic device 112-1 using a BTM request. Alternatively, when electronic device 112-1 does not support the BTM protocol, access point 110-1 may disassociate from electronic device 112-1.

Additionally, prior to providing the recommendation, access point 110-1 may identify at least electronic device 112-1 based at least in part on one or more communication performance metrics associated with at least a subset of the one or more electronic devices 112 (such as at least one of the one or more electronic devices 112 and, in some embodiments, at least 50% of the one or more electronic device 112). This capability may allow access point 110-1 to make the recommendation based at least in part on the communication performance of at least the subset of the one or more electronic devices 112 and/or the access points that are currently available to at least the subset of the one or more electronic devices 112. This situation awareness may ensure that, when the recommendation is to transition electronic device 112-1 to another access point, this other access point is within wireless range of electronic device 112-1.

For example, as described further below with reference to FIG. 4, the one or more communication performance metrics may include: a transmit data rate, RSSI, throughput, a signal-to-noise ratio, and/or a total data volume during a time interval (such as, e.g., 15 s or since a given electronic device in electronic devices 112 associated with access point 110-1). Access point 110-1 may compute an average or a median of the one or more communication performance metrics, e.g., using a moving window with 16 instances of the one or more communication performance metrics, which may be provided by a driver in radio 120-1. Moreover, identifying at least electronic device 112-1 may involve: normalizing the one or more communication performance metrics associated with at least the subset of the one or more electronic devices 112 (such as scaling a given one of the one or more communication performance metrics by a maximum value), calculating distance metrics (such as Euclidean distances, e.g., the sum of the squares of the communication performance metrics) for at least the subset of the one or more electronic devices 112 based at least in part on the normalized one or more communication performance metrics associated with at least the subset of the one or more electronic devices 112, ranking at least the subset of the one or more electronic devices 112 based at least in part on the calculated distance metrics, and/or selecting or identifying an electronic device based at least in part on the ranking (such as electronic device 112-1, which may be at the top of the ranking). Note that electronic devices in the ranking may have a connection with access point 110-1 for, e.g., at least 10 min. This may reduce ping ponging of electronic devices from one access point to another. In some embodiments, electronic device 112-1 is identified for the recommendation because it consumes the most of the capacity of access point 110-1 in the band of frequencies (e.g., it has a high traffic demand) and/or because it has the worst communication performance (such as a lowest data rate, throughput, RSSI, etc.).

Furthermore, prior to providing the recommendation, access point 110-1 may provide requests for beacon reports to the one or more electronic devices 112, and may receive the beacon reports from at least a second subset of the one or more electronic devices 112 (such as, e.g., from at least 50% of the one or more electronic devices 112). For example, the requests and the subsequent responses (with the beacon reports) may be compatible with an IEEE 802.11k standard. The selective providing of the recommendation may be based at least in part on the beacon reports and electronic device 112-1 may be included in al least the second subset of the one or more electronic devices 112. Note that a given beacon report from a given electronic device may include information specifying one or more of the second access points with which a given electronic device in the one or more electronic devices 112 communicates using wireless communication (e.g., one or more of the second access points from which the given electronic device receives beacons).

Then, when electronic device 112-1 is identified for receiving a recommendation (such as when electronic device 112-1 consumes the most capacity and/or has the worst communication performance in the band of frequencies), access point 110-1 may determine which access point to include in the recommendation for electronic device 112-1 using the beacon reports. Notably, access point 110-1 may determine a second ranking of access points 110 that have available capacity metrics that exceed that of access point 110-1 plus the headroom value. Moreover, this second ranking may include the top three access points with respect to electronic device 112-1 based on their communication performance metrics (e.g., RSSIs, received signal-to-noise indications, received channel power indications, etc., as reported by electronic device 112-1 in its beacon report), such as access point 110-2 in the 2.4 GHz band of frequencies, access point 110-1 in the 5 GHz band of frequencies, and access point 110-4 in the 2.4 GHz band of frequencies. Accordingly, in this example, access point 110-1 may select access point 110-2 in the 2.4 GHz band of frequencies as the transition recommendation for electronic device 112-1 because it has more available capacity than access point 110-1, and because it has the highest RSSI as received or measured by electronic device 112-1.

Figure 8:
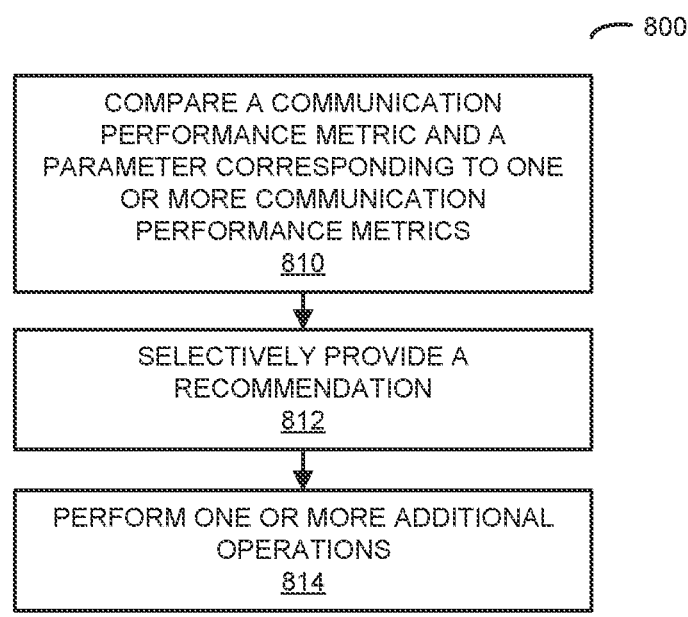
FIG. 8 is a flow diagram illustrating a method for selectively providing a recommendation using an access point in FIG. 1 in accordance with an embodiment of the present disclosure.

Additionally, as described further below with reference to FIGS. 8 and 9, in some embodiments the selective providing of the recommendation may be based at least in part on a history of prior or previous responses to one or more recommendations by at least one of the one or more electronic devices 112. For example, if an electronic device (such as electronic device 112-1) has ignored or declined one or more previous recommendations to transition to a different communication channel, then access point 110-1 may provide the recommendation to another electronic device in the one or more electronic devices 112 (such as electronic device 112-2). In some embodiments, the selective providing of the recommendation may be based at least in part on user preferences, such as a user-specified headroom value or threshold for a given band of frequencies.

Moreover, the load balancing may not be static or a one-time occurrence, such as when electronic device 112-1 associates with access point 110-1. Instead, access point 110-1 may repeat the dynamic load balancing after a time interval has elapsed (such as, e.g., after 1, 5, 10, 15 or 30 min.) or as needed (e.g., based at least in part on communication performance in WLAN 114). Furthermore, the dynamic load balancing may be performed by each of access points 110 on a per-band of frequencies and/or a per-radio basis. In general, when overloaded, an access point (such as access point 110-1) may provide a recommendation to one electronic device per band of frequencies.

In some embodiments, access points 110 may implement other load balancing techniques. For example, access point 110-1 may perform load balancing by selectively responding to probe requests from electronic devices 112 and/or by selectively providing an authentication response to an authentication frame from a given electronic device during association with access point 110-1.

In this way, access point 110-1 may perform load balancing or sharing of electronic devices that are associated with access point 110-1 and that use, e.g., the band of frequencies with the one or more second access points and/or a different frequency band of access point 110-1. This communication technique may be performed dynamically and may ensure fairness and quality of the communication performance in WLAN 114. For example, by performing dynamic load balancing, the communication technique may increase the communication performance (such as the available capacity, the data rate, or the throughput) in WLAN 114 by 30%.

As described further below with reference to FIGS. 5-7, embodiments of the communication technique may be used when one or more of electronic devices 112 do not support IEEE 802.11 k and/or the beacon reports may not provide complete or up-to-date information about which of electronic devices 112 are within wireless range of access points 110. These embodiments of the communication technique may use access points 110 to determine which of electronic devices 112 are within wireless range of access points 110. In some embodiments, these embodiments are used in conjunction with at least some of the preceding operations in order to perform dynamic load balancing in WLAN 114.

If access point 110-1 contacts neighboring access points (such as access points 110-2, 110-3 and 110-4), and asks if they are able to wirelessly communicate with, e.g., electronic device 112-1 in the band of frequencies (or a particular communication channel), in general the answer may be no. This is because the neighboring access points 110 may communicate with electronic device 112-1 using a different communication channel. In order to address this, access point 110-1 may request that the neighboring access points 110 perform a scan of off-channel activity (e.g., in the band of frequencies). However, in order to avoid degraded communication performance, such a scan of off-channel activity may have a short time interval or duration (such as 30 ms). During this time interval, a neighboring access point in neighboring access points 110 may miss wireless communication from electronic device 112-1.

In order to address this problem, access point 110-1 may provide a request to one or more second or neighboring access points (such as access point 110-2) via network 116 using wired or wireless communication. This request may specify a band of frequencies or a communication channel (such as channel 1) and at least electronic device 112-1. In response to this request, access point 110-2 may perform a scan of the specified communication channel. Moreover, access point 110-2 may provide, via WLAN 114 (and, thus, using wireless communication) or network 116 (and, thus, using wired communication), a trigger message to access point 110-1 in order to trigger non-interrupting fake traffic (i.e., one or more packets or frames that will not disrupt communication) from access point 110-1 to electronic device 112-1. A payload in the trigger message may include a signature of electronic device 112-1 (such as a MAC address of electronic device 112-1). For example, in response to the trigger message, access point 110-1 may provide, using wireless communication, fake traffic for at least electronic device 112-1 (i.e., traffic that is otherwise unnecessary for electronic device 112-1), such as a management frame that is unicast to electronic device 112-1.

Then, in response to the fake traffic, electronic device 112-1 may provide, using wireless communication in the communication channel, a response to access point 110-1, such as an acknowledgment. Separately or in addition to being received by access point 110-1, the acknowledgment may be received by access point 110-2 during its scan of the communication channel. Next, access point 110-2 may provide a report, via WLAN 114 (and, thus, using wireless communication) or network 116 (and, thus, using wired communication), with at least a communication performance metric of any of electronic devices 112 from which it received wireless signals during the scan. For example, the report may indicate an RSSI, a received signal-to-noise indication, or a received channel power indication of electronic device 112-1.

Using the information in this report, access point 110-1 may perform the dynamic load balancing described previously. Notably, the information in the report may be used instead of and/or in addition to the information in the beacon reports in order to determine the recommendation.

In this way, access points 110 may collaboratively determine which of electronic devices 112 are in wireless range, so that the recommendation is made with appropriate wireless situational awareness. This may ensure that electronic device 112-1 is not recommended to transition to an access point with which it has poor communication performance or with which it is currently unable to wirelessly communicate.

Figure 2:
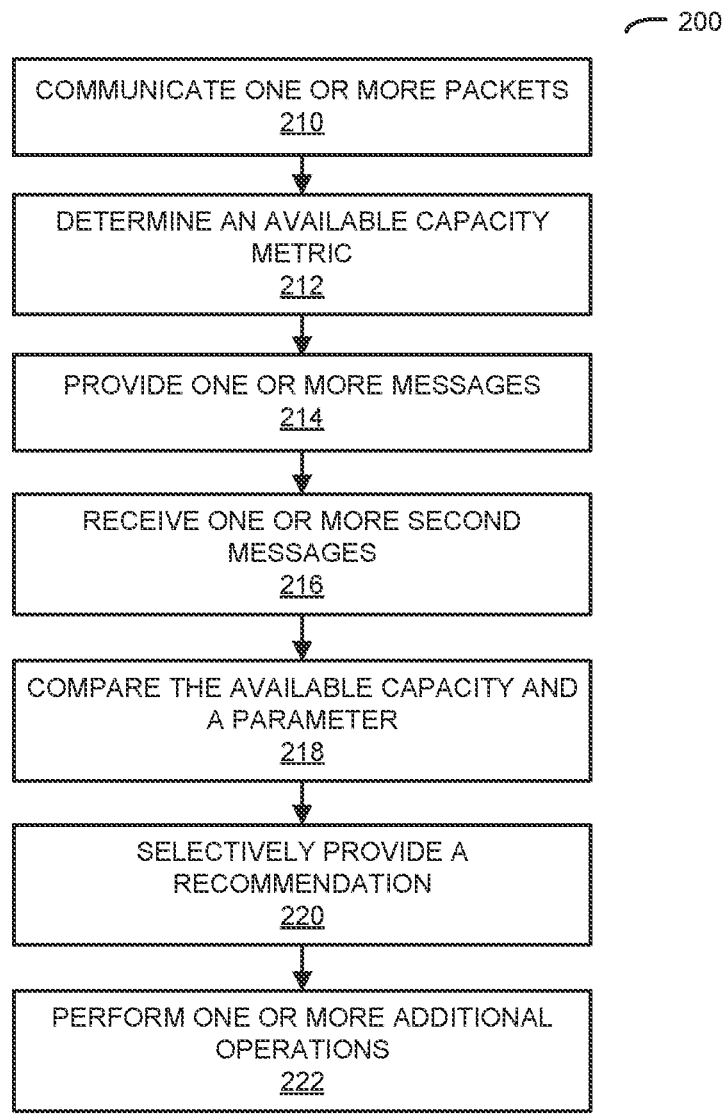
FIG. 2 is a flow diagram illustrating a method for performing dynamic load balancing using an access point in FIG. 1 in accordance with an embodiment of the present disclosure.

We now describe embodiments of a method, FIG. 2 presents a flow diagram illustrating an example of a method 200 for performing dynamic load balancing using an access point, such as access point 110-1 in FIG. 1.

During operation, the access point may communicate one or more packets or frames (operation 210) to and/or from one or more electronic devices, e.g., using wireless communication. Based at least on the communicated packets or frames, the access point may determine an available capacity metric (operation 212) of the access point. Then, the access point may provide one or more messages (operation 214) to one or more second access points, where the one or more messages include the determined available capacity metric of the access point, and may receive one or more second messages (operation 216) from the one or more second access points, where the one or more second messages include available capacity metrics of the one or more second access points. For example, the one or more messages and the one or more second messages may be communicated using wired or wireless communication. Note that the available capacity metric of the access point may be associated with a band of frequencies, such as the present utilization of an operating band of frequencies by the access point at its location. In some embodiments, the one or more second access points may include one or more neighboring access points of the access point, and the access point may identify the one or more neighboring access points based at least in part on wireless ranges between the one or more neighboring access points and the access point.

Moreover, the access point may compare the available capacity metric and a parameter (operation 218) corresponding to the available capacity metrics. For example, the parameter may include a headroom value plus a moment of a distribution of the available capacity metrics of the one or more second access points (such as an average or a median) of the one or more second access points. Note that the comparison may indicate that the access point is overloaded in the band of frequencies.

Based at least in part on the comparison, the access point may dynamically perform load balancing, where the load balancing may involve the access point selectively providing a recommendation (operation 220) to at least a first connected electronic device of the one or more electronic devices, and the recommendation may indicate that the first connected electronic device, which is associated with the access point, transition to a different communication channel. Note that, prior to the load balancing, communication with the first connected electronic device may use the band of frequencies. Moreover, the communication channel may be associated with one of the one or more second access points, or may be in a second band of frequencies and associated with the access point. In some embodiments, the recommendation may be selectively provided using a BTM protocol. Alternatively, when the first connected electronic device does not support the BTM protocol, the access point may disassociate from the first connected electronic device, such as by discontinuing a connection with the first connected electronic device.

In some embodiments, the access point optionally performs one or more additional operations (operation 222). For example, prior to providing the recommendation (operation 220), the access point may identify the first connected electronic device (which may receive improved quality of service in response to the transition) based at least in part on one or more communication performance metrics associated with at least a subset of the one or more electronic devices which may include at least one electronic device). Note that the one or more communication performance metrics may include: a data rate, a received signal strength indicator, and/or a total data volume during a time interval. Moreover, identifying at least the first connected electronic device may involve: normalizing the one or more communication performance metrics associated with at least the subset of the one or more electronic devices, calculating distance metrics of at least the subset of the one or more electronic devices based at least in part on the normalized one or more communication performance metrics associated with at least the subset of the one or more electronic devices, and/or ranking at least the subset of the one or more electronic devices based at least in part on the calculated distance metrics.

In some embodiments, prior to providing the recommendation (operation 220), the access point may provide requests for beacon reports to the one or more electronic devices, and may receive the beacon reports from at least a second subset of the one or more electronic devices (which may include at least one electronic device, and may be the same as or different from the subset of the one or more electronic devices). The providing of the recommendation (operation 220) may be based at least in part on the beacon reports and the first connected electronic device may be included in at least the second subset of the one or more electronic devices. Note that a given beacon report may include information specifying one or more of the second access points with which a given electronic device in the one or more electronic devices communicates using wireless communication.

Moreover, whether or not at least the first connected electronic device performs the recommended transition (i.e., roams), the access point may repeat performing the dynamic load balancing after a time interval has elapsed.

Furthermore, the providing of the recommendation (operation 220) may be based at least in part on a history of prior or previous responses to one or more recommendations by at least one of the one or more electronic devices.

Figure 3:
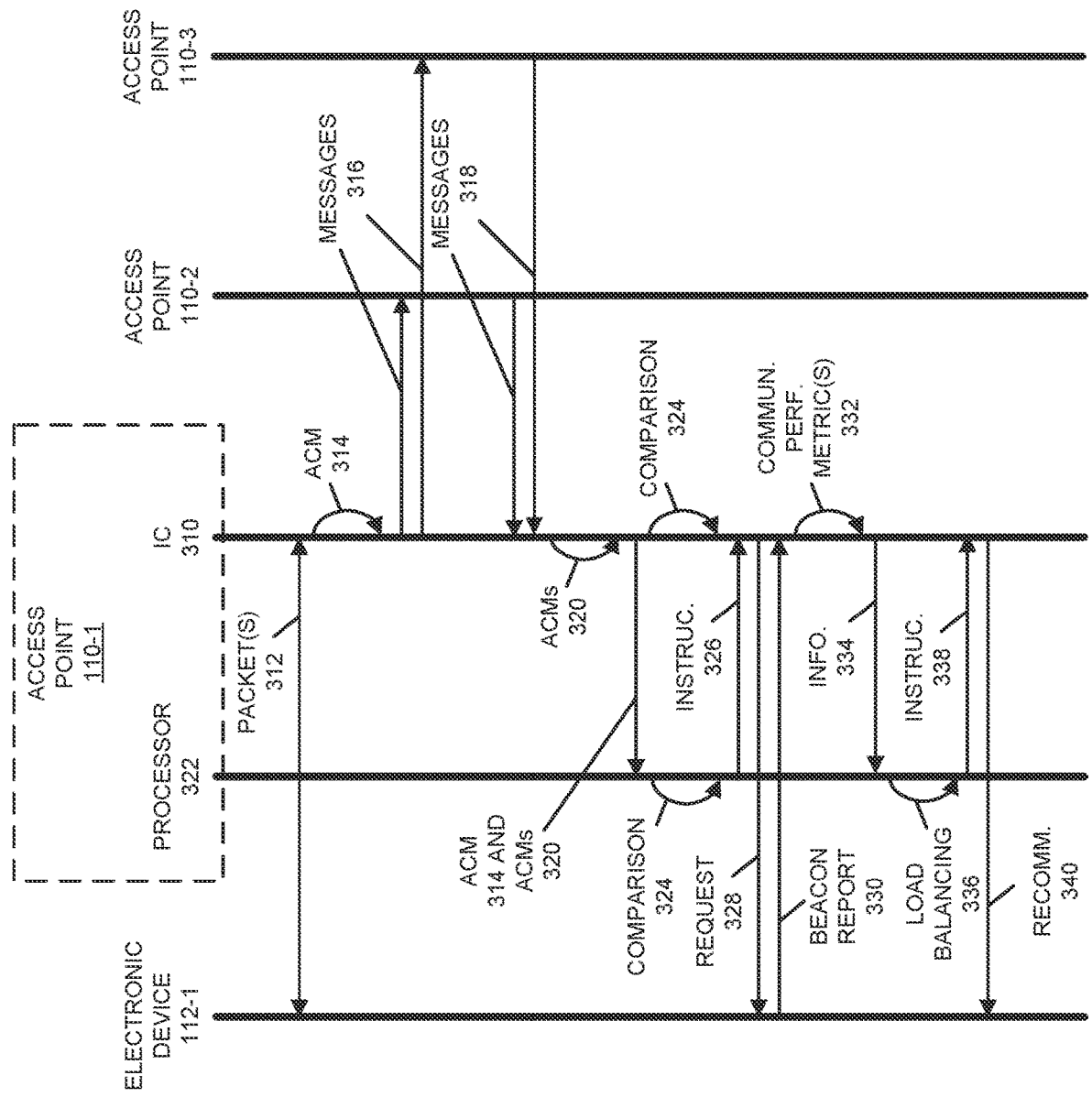
FIG. 3 is a drawing illustrating communication among the electronic devices in FIG. 1 in accordance with an embodiment of the present disclosure.
Figure 4:
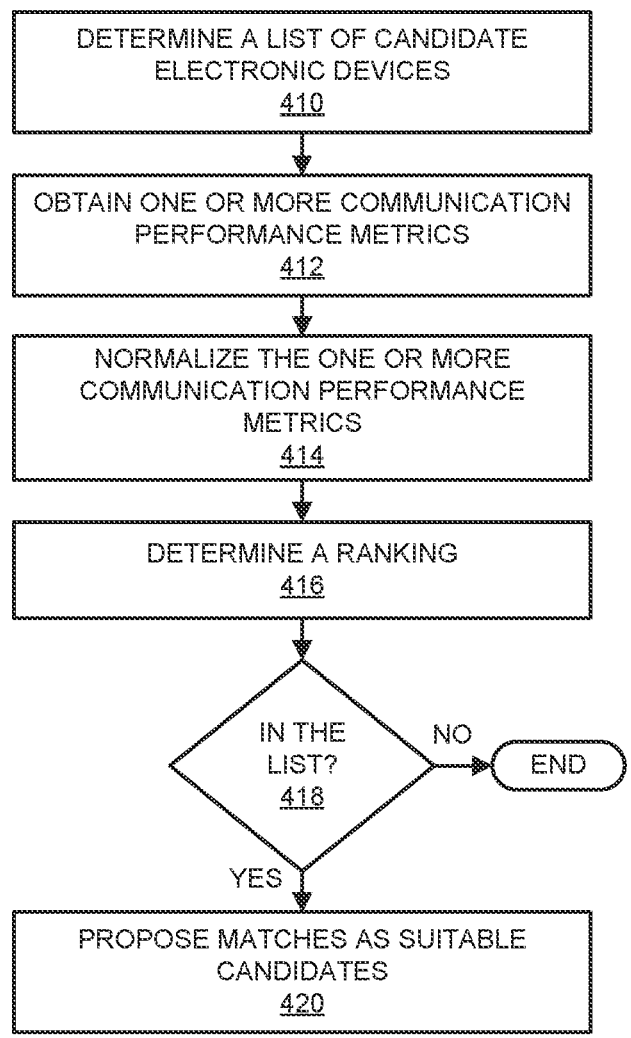
FIG. 4 is a flow diagram illustrating a method for performing dynamic load balancing using an access point in FIG. 1 in accordance with an embodiment of the present disclosure.

FIG. 3 presents a drawing illustrating an example of communication among access points 110-1, 110-2 and 110-3 and electronic device 112-1. Notably, an interface circuit (IC) 310 in access point 110-1 may communicate one or more packets 312 or frames with electronic device 112-1. Based on this communication, interface circuit 310 may determine an available capacity metric (ACM) 314 of access point 110-1. Then, interface circuit 310 may provide one or more messages 316 to access points 110-2 and 110-3, where the one or more messages 316 include the determined available capacity metric 314. Moreover, interface circuit 310 may receive one or more messages 318 from access points 110-2 and 110-3, where the one or more messages 318 include available capacity metrics 320 of access points 110-2 and 110-3.

Next, interface circuit 310 or processor 322 in access point 110-1 may compare 324 available capacity metric 314 and a parameter corresponding to available capacity metrics 320. In some embodiments, processor 322 may optionally provide an instruction 326 to interface circuit 310 to request a beacon report 330. Moreover, interface circuit 310 may provide a request 328 for a beacon report 330 to electronic device 112-1, and in response may receive a beacon report 330 from electronic device 112-1. Then, interface circuit 310 may provide information 334, such as beacon report 330, one or more communication performance metrics 332 that characterize communication with electronic device 112-1 and, optionally, a result of comparison 324, to processor 322.

Based at least in part on the comparison 324, beacon report 330 and/or the one or more communication performance metrics 332, processor 322 may dynamically perform load balancing 336. For example, processor 322 may identify access point 110-2 as having more available capacity than access point 110-1 and as being in wireless range of electronic device 112-1. Moreover, processor 322 may identify that electronic device 112-1 is suitable for transition, e.g., based on its communication performance with access point 110-1.

Furthermore, based on these identifications, processor 322 may instruct 338 interface circuit 310 to provide a recommendation 340 to electronic device 112-1, e.g., using a BTM request. This recommendation may indicate that electronic device 112-1, which is associated with access point 110-1, transition to a different communication channel. For example, the different communication channel may be associated with access point 110-1. Alternatively, the different communication channel may be associated with access point 110-2. Thus, in response to recommendation 340, electronic device 112-1 may transition to the different communication channel.

As discussed previously, in some embodiments of the communication technique, an electronic device that is to transition during dynamic load balancing in the communication technique may be identified using a ranking of the electronic devices. This is shown in FIG. 4, which presents a flow diagram illustrating an example of a method 400 for performing dynamic load balancing using an access point, such as access point 110-1 in FIG. 1. During operation, the access point may determine a preliminary list of candidate electronic devices (operation 410) to transition. Then, the electronic device may obtain one or more communication performance metrics (operation 412), such as traffic volume, a transmit data rate and a signal-to-noise ratio. Moreover, the access point may normalize the one or more communication performance metrics (operation 414) and may determine a ranking of electronic devices (operation 416) based at least in part on the one or more normalized communication performance metrics. Next, the access point may determine (operation 418) whether any of the electronic devices in the top N of the ranking are in the list of candidate electronic devices. If yes, the access point may propose the matches (operation 420) as qualified or suitable electronic devices for transitioning during load balancing in the communication technique.

In some embodiments of the communication technique, electronic devices that are candidate electronic devices may have high traffic volume in a band of frequencies, yet a low transmission rate and/or a low signal-to-noise ratio. In general, transitioning such a heavy-traffic electronic device may have more significance or impact than transitioning an idle electronic device. Consequently, transmission traffic may be used as a criterion to identify candidate electronic devices to steer or transition.

As described previously, a variety of communication performance metrics may be used to identity candidate electronic devices. For example, the transmit data rate, the RSSI or the signal-to-noise ratio, and the transmit traffic volume or total data volume may be used. The access point may normalize each of these communication performance metrics using a 0 to 10 scale for one or more of its associated electronic devices. Notably, the maximum value for a given one of these communication performance metrics may be mapped to a value of 10 and the remaining values of the given communication performance metric may be mapped to values between 0 and 10. Note that, because a low transmit data rate may have preference for steering or transitioning, one minus the transmit data rate may be used as one of the one or more communication performance metrics. Similarly, because a low signal-to-noise ratio may have preference for steering or transitioning, one minus the signal-to-noise ratio or the RSSI may be used as another one of the one or more communication performance metrics. Next, the access point may calculate the Euclidean distance of the three normalized communication performance metrics. Moreover, the electronic devices may be ranked according to their corresponding Euclidean distances, and the top N electronic devices may be further considered for steering or transitioning.

In some embodiments, the available capacity and/or a load assessment may be determined by the access point as follows. The access point may calculate a median of the available capacity for each of its radios over the most recent time interval (such as M seconds times N samples, e.g., 16×15 ms). Moreover, the access point may calculate the maximum possible user data rate based at least in part on a type of physical layer (or radio), the configured bandwidth, a number of spatial streams, a guard interval and/or a modulation coding scheme (MCS). For example, for a physical layer that is compatible with IEEE 802.11ac, a bandwidth of 80 MHz, four spatial streams, a guard interval of one, and an MCS of nine, the maximum possible physical data rate may be 1,733,300 kbps and the maximum possible user data rate may be 1,559,970 kbps. Furthermore, the access point may obtain the actual airtime usage percentage. For example, the actual airtime usage percentage may be 0% busy, 1% transmit and 18% receive, for a total of 19%. Note that busy may indicate interference in a 2.4 or 5 GHz band of frequencies.

Additionally, the access point may compute the maximum available data rate for a given environment as follows. For given physical layer capabilities and airtime usage, the available capacity may be the maximum capacity equal to the user data rate; and interference may equal to the airtime percentage for receive and the airtime percentage for busy. Then, the maximum capacity may equal the maximum capacity equal to the user data rate times 100 minus the interference, which is all then divided by 100. Moreover, the current capacity may equal the maximum capacity times the airtime for transmit, which is all then divided by 100. Furthermore, the available capacity may be the maximum capacity minus the current capacity. For example, if a user data rate is 1,559,970 kbps, then the maximum capacity may be 1,279,175 kbps, the current capacity may be 12,791 kbps and the available capacity may be 1,266,383. Note that the available capacity may be calculated every M seconds (such as every 15 s) for each radio in the access point. The median of N samples (such as 16) may provide the available capacity metric for a particular radio in a particular band of frequencies. Neighboring or proximate access points may share the average capacities of all of their radios regularly (such as, e.g., every 15 s). Next, the access point may determine, for a given one of its radios, the average available capacity of the radios in the neighboring access points operating in at least the same band of frequencies as the given radio or operating in any band of frequencies (such as any Wi-Fi band of frequencies). This access point radio may be determined to be overloaded when its average capacity is less than the average capacity of the radios in the neighboring access points or when its average capacity is less than the average capacity of the radios in the neighboring access points plus a headroom value (such as, e.g., 10%).

As noted previously, in some embodiments, one or more of the electronic devices may not support an IEEE 802.11k standard or protocol. In order to address these embodiments, an electronic device may be collaboratively detected by multiple access points.

Figure 5:
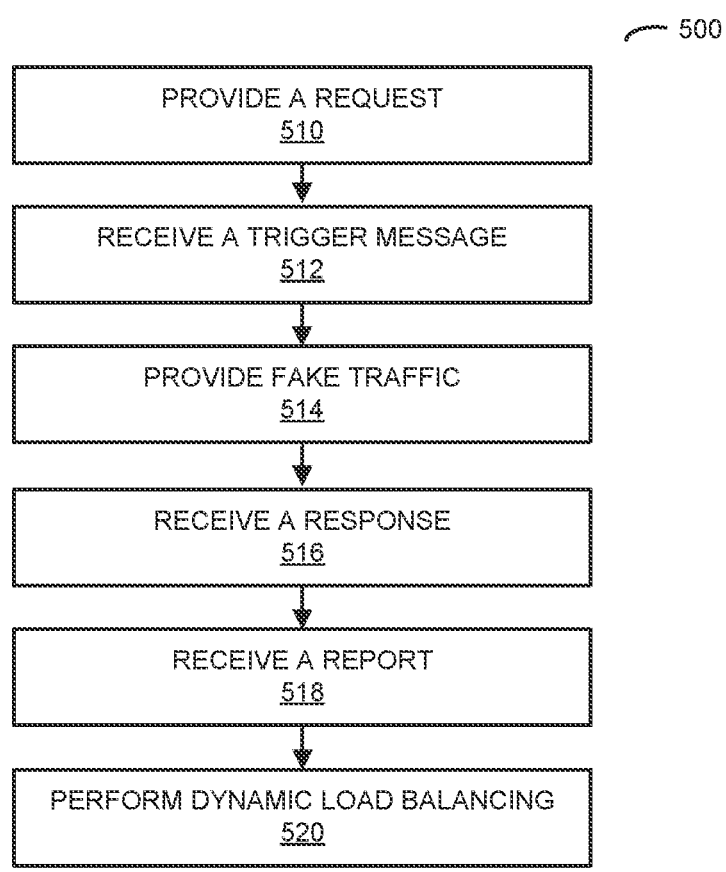
FIG. 5 is a flow diagram illustrating a method for performing collaborative detection of an electronic device using an access point in FIG. 1 in accordance with an embodiment of the present disclosure.

FIG. 5 presents a flow diagram illustrating a method 500 for performing collaborative detection of an electronic device using an access point, such as access point 110-1 in FIG. 1. During operation, the access point may provide a request (operation 510) to a second access point using wired or wireless communication, where the request specifies a communication channel and the electronic device (which may be associated with the access point, and which may be a candidate for steering or transitioning to a different communication channel). Then, the access point may receive a trigger message (operation 512) from the second access point (e.g., using wired or wireless communication). This trigger message may contain a payload that includes information that specifies the electronic device, such as a signature of the electronic device (e.g., a MAC address of the electronic device). Moreover, the trigger message may instruct the access point to provide fake traffic to the electronic device. In response, the access point may provide the fake traffic (operation 514) to the electronic device using wireless communication. For example, the fake traffic may include a management frame for the electronic device. Next, the access point may receive a response (operation 516) from the electronic device using wireless communication, such as an acknowledgment. Moreover, the access point may receive a report (operation 518) from the second access point using wired or wireless communication. This report may specify at least a communication performance metric of the electronic device, such as a signal strength (e.g., an RSSI) of the electronic device that was measured by the second access point. In some embodiments, the access point may optionally perform dynamic load balancing (operation 520) in a WLAN based at least in part on the information included in or specified by the report.

Figure 6:
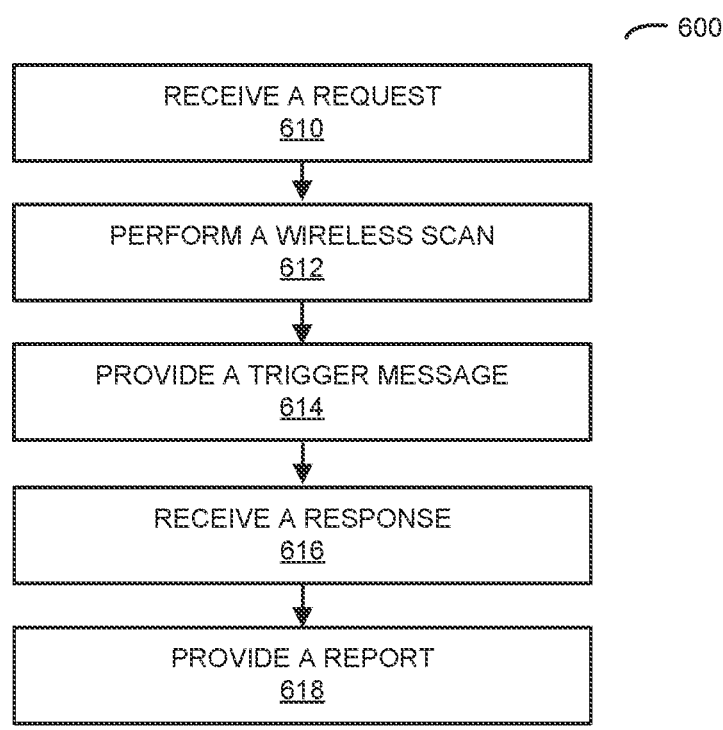
FIG. 6 is a flow diagram illustrating a method for performing collaborative detection of an electronic device using an access point in FIG. 1 in accordance with an embodiment of the present disclosure.

FIG. 6 presents a flow diagram illustrating a method 600 for performing collaborative detection of an electronic device using an access point, such as access point 110-2 in FIG. 1. During operation, the access point may receive a request (operation 610) from a second access point using wired or wireless communication, where the request specifies a communication channel and the electronic device. Note that the second access point may be a neighbor of the access point. For example, a neighbor of the access point may be within wireless range of the access point.

In response to this request, the access point may perform a wireless scan (operation 612) of the specified communication channel. Moreover, the access point may provide, using wired or wireless communication, a trigger message (operation 614) to the second access point with an instruction for the second access point to provide fake traffic to the electronic device. Furthermore, the trigger message may include a signature of the electronic device. Notably, the signature may include information that specifies the electronic device, such as a MAC address of the electronic device.

Then, the access point may receive, using wireless communication, a response (operation 616) from the electronic device to the fake traffic and the response may be addressed to the second access point. For example, the fake traffic may include a management frame for the electronic device and/or the response may include an acknowledgment.

Next, the access point may provide, using wired or wireless communication, a report (operation 618) to the second access point. This report may specify a signal strength (such as an RSSI) of the electronic device and, more generally, at least a communication performance metric of the electronic device.

Figure 7:
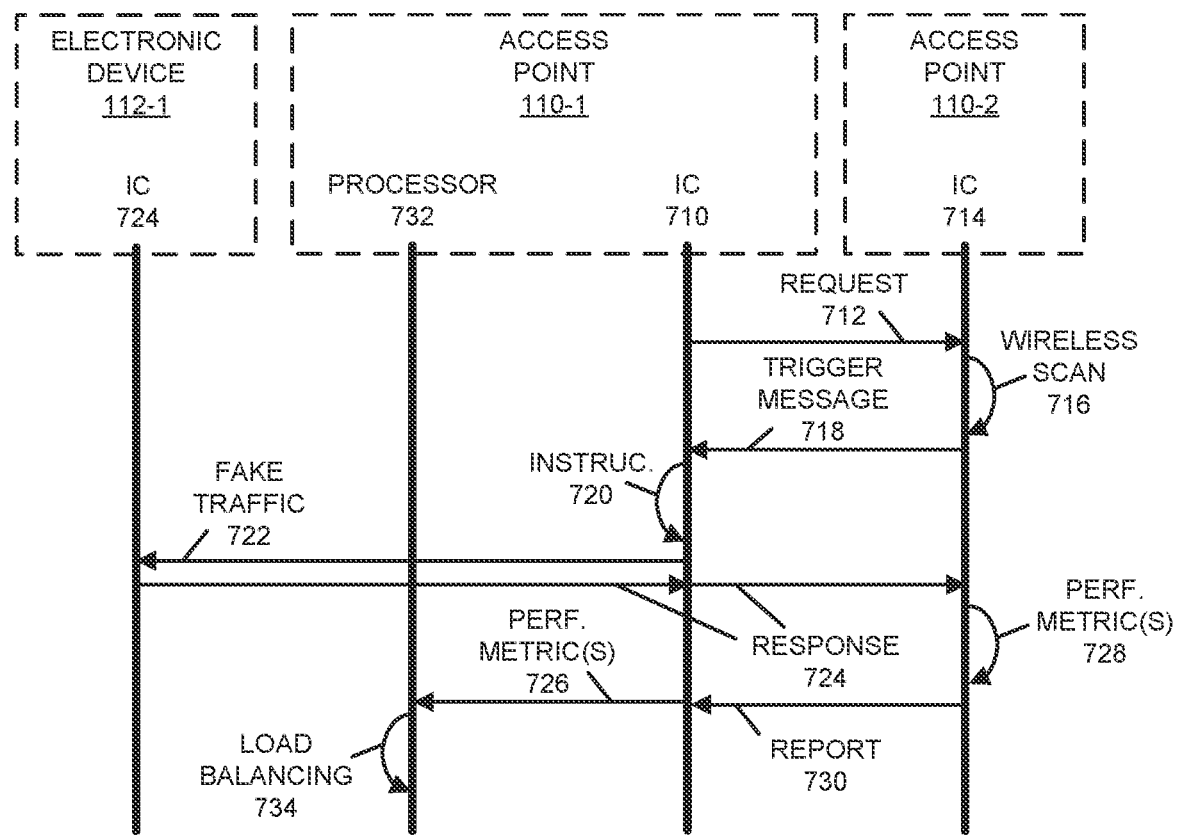
FIG. 7 is a drawing illustrating communication among the electronic devices in FIG. 1 in accordance with an embodiment of the present disclosure.

FIG. 7 presents a drawing illustrating an example of communication among access points 110-1 and 110-2 and electronic device 112-1. Notably, an interface circuit (IC) 710 in access point 110-1 may provide, using wired or wireless communication, a request 712 to access point 110-2. This request may specify a communication channel (such as a band of frequencies) and electronic device 112-1. After receiving request 712, an interface circuit 714 in access point 110-2 may perform a wireless scan 716 of the specified communication channel. Moreover, interface circuit 714 may provide, using wired or wireless communication, a trigger message 718 to access point 110-1 with an instruction 720 for access point 110-1 to provide fake traffic 722 to electronic device 112-1.

After receiving trigger message 718 and extracting instruction 720, interface circuit 710 may provide, using wireless communication, fake traffic 722 to electronic device 112-1. For example, fake traffic 722 may include a management frame. Moreover, after receiving fake traffic 722, electronic device 112-1 may provide, using wireless communication, a response 724 (such as an acknowledgment) to access point 110-1. Interface circuit 714 may receive response 724 and may use this to determine one or more communication performance metrics 728 of electronic device 112-1. Alternatively, interface circuit 714 may receive response 724 during wireless scan 716, and may use this to determine one or more communication performance metrics 728 of electronic device 112-1.

Next, interface circuit 714 may provide, using wired or wireless communication, a report 730 to access point 110-1. This report may include information that specifies the one or more communication performance metrics 728. After receiving report 730, interface circuit 710 may provide the one or more communication performance metrics 728 to processor 732 in access point 110-1. Furthermore, processor 732 may subsequently perform dynamic load balancing 734 based at least in part on the one or more communication performance metrics 728.

One challenge with load balancing is that an electronic device may or may not honor a recommendation to transition to a different channel and/or a different access point. For example, an electronic device may decline a transition recommendation because it may not be able to receive wireless signals from the recommended access point or it may find that the recommended access point has a low RSSI. Alternatively, the electronic device may have its own connect logic or may determine that the recommended access point is not the correct choice for the electronic device. In some embodiments of the communication technique, the access point may reduce or eliminate this problem by selectively making a transition recommendation based on a behavioral profile of the electronic device, such as a history of previous responses by the electronic device to recommendations to transition. Notably, this additional information may allow, as needed, the access point to make transition recommendations to the electronic device less often, or to make the recommendations more forcefully to encourage compliance.

Another challenging with load balancing is that an electronic device may repeatedly receive recommendations to transition. These repeated transitions can degrade the communication performance of the electronic device. In order to address this problem, in some embodiments the access point may communicate with adjacent or neighboring access points to determine when the electronic device most-recently received a transition recommendation. This historical information may allow the access point to gate or selectively provide a recommendation, so that the electronic device does not make frequent transitions or ping pong among different access points.

We now describe embodiments of a method. FIG. 8 presents a flow diagram illustrating an example of a method 800 for selectively providing a recommendation using an access point, such as access point 110-1 in FIG. 1.

During operation, the access point may compare a communication performance metric of the access point and a parameter (operation 810) corresponding to communication performance metrics of one or more second access points. For example, the communication performance metric and/or a given one of the communication performance metrics may include an available capacity.

Based at least in part on the comparison and a history of responses of at least a first connected electronic device of one or more electronic devices to one or more previous recommendations, the access point may selectively provide the recommendation (operation 812) to the first connected electronic device, and the recommendation may indicate that the first connected electronic device, which is associated with the access point, transition to a different communication channel (such as a communication channel that has a lighter load).

In some embodiments, the access point may optionally perform one or more additional operations (operation 814). For example, the access point may communicate one or more packets or frames to and/or from the one or more electronic devices. Then, the access point may determine the communication performance metric of the access point based at least in part on the communication of the one or more packets or frames. Furthermore, the access point may receive one or more messages from the one or more second access points, where the one or more messages include the communication performance metrics of the one or more second access points. Note that access point may communicate with the one or more second access points using wired or wireless communication.

Moreover, the access point may provide one or more second messages to the one or more second access points, where the one or more second messages include the determined available communication performance metric.

Furthermore, the selective providing of the recommendation (operation 812) may be based at least in part on a weight corresponding to the history of responses. Notably, the access point may determine the weight based at least in part on the history of responses, and the weight may increase as a number of times the first connected electronic device declined the one or more previous recommendations increases. Alternatively or additionally, the weight may increase as a data rate or throughput associated with the first connected electronic device decreases, as a traffic demand associated with the first connected electronic device increases, or a signal-to-noise ratio or a signal strength (such as an RSSI) associated with the first connected electronic device decreases. This weight calculation may give an electronic device that recently declined a recommendation a higher weight than it received previously.

Note that when the weight is higher than that of its peers, an electronic device will not be selected to receive recommendation. For example, when the weight is less than a first threshold, the recommendation may be selectively provided. Alternatively, when the weight is greater than the first threshold and less than a second threshold, the recommendation may be selectively provided along with a warning to encourage acceptance of the recommendation. For example, the warning may indicate that the first connected electronic device is about to be disassociated from the access point. In some embodiments, when the weight is greater than the second threshold, the electronic device may not provide the recommendation. Instead, the access point may disassociate from the first connected electronic device.

Additionally, the access point may provide information indicating that the access point is associated with the first connected electronic device to at least a second access point in the one or more second access points. (This information may be provided in response to a request from the second access point.) In response, the access point may receive a notification from the second access point that indicates a timestamp when the first connected electronic device transitioned from the second access point. In these embodiments, the selective providing of the recommendation (operation 812) may be based at least in part on the timestamp. For example, when an elapsed time since the timestamp is less than a time interval (such as, e.g. 10 min), the access point may not provide the recommendation.

Note that the channel may be associated with the access point or one of the one or more second access points.

Moreover, the recommendation may be selectively provided (operation 812) using a BTM protocol. Alternatively, when the first connected electronic device does not support the BTM protocol, the access point may disassociate from the first connected electronic device.

Furthermore, the parameter may include a headroom value plus a moment of a distribution of the communication performance metrics (such as an average or a median of available capacity metrics of the one or more second access points).

Additionally, prior to selectively providing the recommendation (operation 812), the access point may identify at least the first connected electronic device based at least in part on one or more communication performance metrics associated with at least a subset of the one or more electronic devices. For example, the one or more communication performance metrics may include: a data rate, a throughput, a received signal strength indicator, and/or a total data volume during a time interval. Moreover, identifying at least the first connected electronic device may involve: normalizing the one or more communication performance metrics associated with at least the subset of the one or more electronic devices, calculating distance metrics of at least the subset of the one or more electronic devices based at least in part on the normalized one or more communication performance metrics associated with at least the subset of the one or more electronic devices, and/or ranking at least the subset of the one or more electronic devices based at least in part on the calculated distance metrics. In some embodiments, the access point may identify the first connected electronic device, a model or type of the first connected electronic device, or a capability of the first connected electronic device (such as an integrated circuit in the first connected electronic device or a manufacturer of the integrated circuit) based at least in part on information included in a packet or frame received from the first connected electronic device, such as a MAC address and its QUI in a MAC header. The access point may store information that specifies the identity of the first connected electronic device with the history of responses associated with the first connected electronic device. More generally, the access point may store this information in a behavioral profile associated with the first connected electronic device. Note that the history of responses and/or the behavioral profile may be stored locally in the access point and/or remotely from the access points (e.g., in a controller or a management system that is associated with the access point).

In some embodiments, prior to selectively providing the recommendation (operation 812), the access point may provide requests for beacon reports to the one or more electronic devices, and may receive the beacon reports from at least a second subset of the one or more electronic devices. The selective providing of the recommendation (operation 812) may be based at least in part on the beacon reports and the first connected electronic device may be included in at least the second subset of the one or more electronic devices. Note that a given beacon report may include information specifying one or more of the second access points with which a given electronic device in the one or more electronic devices communicates using wireless communication. Thus, the selective providing of the recommendation may be based at least in part on communication performance at the first connected electronic device, such as the communication performance of the one or more of the second access points with which a given electronic device in the one or more electronic devices communicates using wireless communication, as measured at the second subset of the one or more electronic devices.

In some embodiments of methods 200 (FIG. 2), 400 (FIG. 4), 500 (FIG. 5), 600 (FIG. 6) and/or 800, there may be additional, fewer and/or different operations. Furthermore, the order of the operations may be changed, and/or two or more operations may be combined into a single operation.

Figure 9:
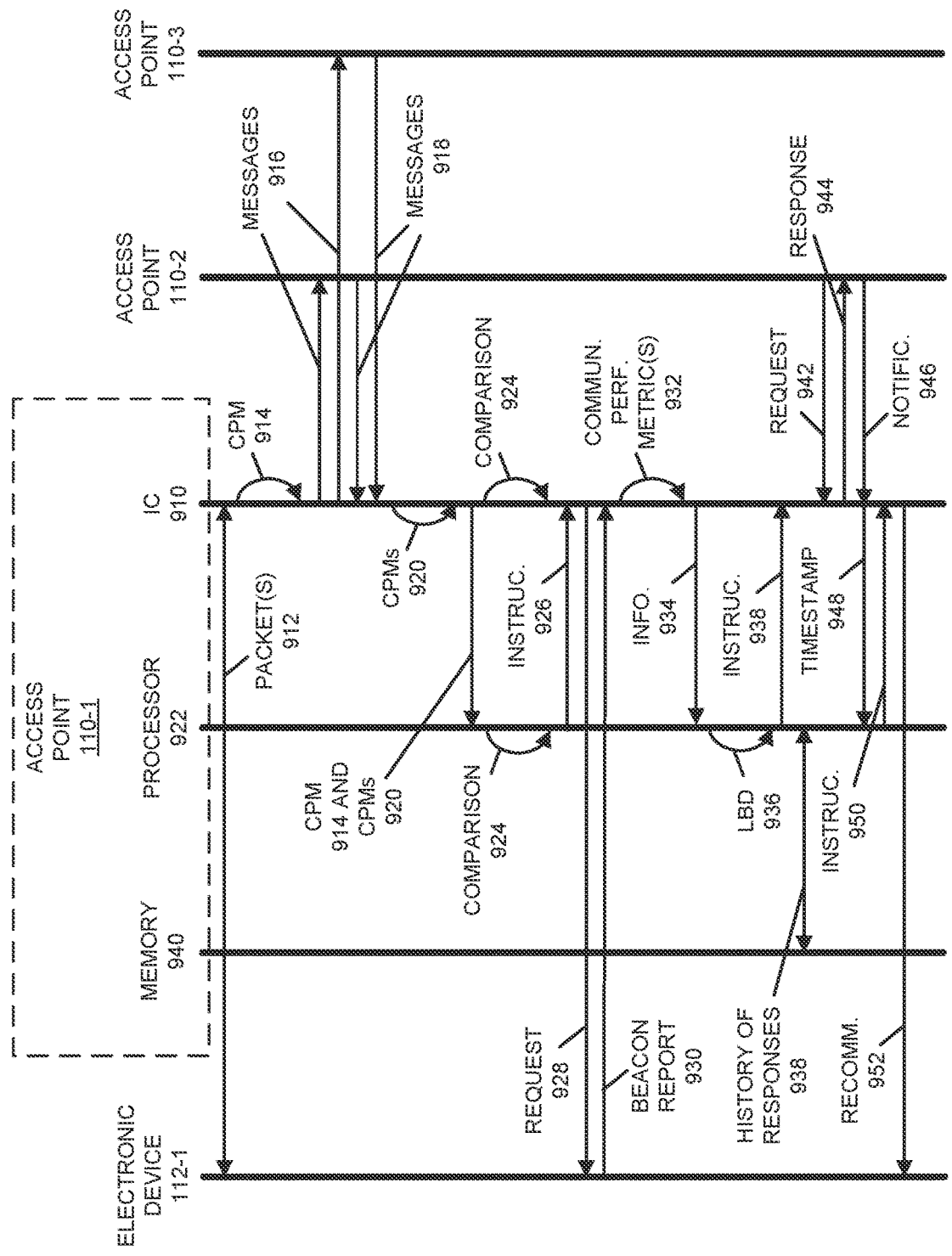
FIG. 9 is a drawing illustrating communication among the electronic devices in FIG. 1 in accordance with an embodiment of the present disclosure.

FIG. 9 presents a drawing illustrating an example of communication among access points 110-1, 110-2 and 110-3 and electronic device 112-1. Notably, an interface circuit (IC) 910 in access point 110-1 may communicate one or more packets 912 or frames with electronic device 112-1 (which is an instance of a connected electronic device). Based on this communication, interface circuit 910 may determine a communication performance metric (CPM) 914 of access point 110-1. Then, interface circuit 910 may provide one or more messages 916 to access points 110-2 and 110-3, where the one or more messages 916 include the determined communication performance metric 914. Moreover, interface circuit 910 may receive one or more messages 918 from access points 110-2 and 110-3, where the one or more messages 918 include communication performance metrics 920 of access points 110-2 and 110-3.

Next, interface circuit 910 or processor 922 in access point 110-1 may compare 924 communication performance metric 914 and a parameter corresponding to communication performance metrics 920. In some embodiments, processor 922 may optionally provide an instruction 926 to interface circuit 910 to request a beacon report 930. Moreover, interface circuit 910 may provide request 928 for a beacon report 930 to electronic device 112-1, and in response may receive beacon report 930 from electronic device 112-1. Then, interface circuit 910 may provide information 934, such as beacon report 930, one or more communication performance metrics 932 that characterize communication with electronic device 112-1 and, optionally, a result of comparison 924, to processor 922.

Based at least in part on the comparison 924, beacon report 930 and/or the one or more communication performance metrics 932, processor 922 may dynamically perform load balancing by making a load-balancing decision (LBD) 936. For example, processor 922 may identify access point 110-2 as having an improved communication performance metric (such as an available capacity) than access point 110-1 and as being in wireless range of electronic device 112-1. Moreover, processor 922 may identify that electronic device 112-1 is suitable for transition, e.g., based on its communication performance with access point 110-1.

Furthermore, processor 922 may access a history of responses 938 in memory 940 in access point. This history of responses may indicate how many times electronic device 112-1 previously declined (or accepted) previous transition recommendations. Alternatively or additionally, interface circuit 910 may receive a request 942 from another access point (such as access point 110-2) as to whether or not access point 110-1 is associated with electronic device 112-1. In response, interface circuit 910 may provide a response 944 that indicates that access point 110-1 is associated with electronic device 112-1. Then, access point 110-2 may provide a notification 946 with a timestamp 948 when electronic device 112-1 transitioned from access point 110-2. After receiving this notification, interface circuit 910 may provide timestamp 948 to processor 922.

Additionally, based on the identification of electronic device 112-1, the history of responses 938, and/or the timestamp 948, processor 922 may instruct 950 interface circuit 910 to selectively provide a recommendation 952 to electronic device 112-1, e.g., using a BTM request. This recommendation may indicate that electronic device 112-1, which is associated with access point 110-1, transition to a different communication channel. For example, the different communication channel may be associated with access point 110-1. Alternatively, the different communication channel may be associated with access point 110-2.

Note that recommendation 952 may be provided when electronic device 112-1 has rejected fewer than two previous transition recommendations and/or when an elapsed time since timestamp 948 is greater than a time interval (such as, e.g., 10 min). Alternatively, recommendation 952 may be provided with a warning (such as that disassociation is imminent) when electronic device 112-1 has rejected more than two previous transition recommendations and less than three previous transition recommendations. In some embodiments, recommendation 952 may not be provided when electronic device 112-1 has rejected more than three previous transition recommendations, instead, processor 922 may instruct interface circuit 910 to disassociate from electronic device 112-1 and to ignore electronic device 112-1 (such as probe requests from electronic device 112-1) for a second time interval (such as, e.g., 10 min).

In response to instruction 950, interface circuit 910 may provide recommendation 952 to electronic device 112-1. Then, in response to recommendation 952, electronic device 112-1 may transition to the different communication channel.

While FIGS. 3, 7 and 9 illustrate communication between components using unidirectional or bidirectional communication with lines having single arrows or double arrows, in general the communication in a given operation in these figures may involve unidirectional or bidirectional communication.

In some embodiments of the communication technique, access-point capacity is periodically calculated and published to neighboring access points. Moreover, an access point may periodically receive capacity information from the neighboring access points. This capacity information may be used to determine if the available capacity of the access point is better or worst compared to the neighboring access points. If the available capacity of the access point is lower than average of the available capacity of the neighboring access points, then the access point may decide to shortlist and steer some low-performing electronic devices or stations.

For example, stations may be shortlisted based at least in part on periodically collected communication-performance statistics. Notably, stations may be assigned scores based at least in part on the collected communication-performance statistics, and the highest-scored stations may be shortlisted for steering.

In some embodiments, a shortlisted station may be steered to neighboring access point using an IEEE 802.11v BTM request/response technique or, if IEEE 802.11v is not supported by a station, using a disassociation frame However, not all stations may honor IEEE 802.11v BTM requests from the access point. Consequently, the effort of the access point to shortlist and steer a station may be wasted. This may especially be the case if the same station is repeatedly shortlisted because the station did not move to new access point during a previous transition cycle. In general, there are a variety of reasons why a station may not move. For example, in some embodiments, a station may not be able to find the new access point suggested by the current access point or the station may find it at low RSSI. Alternatively, a station may have its own connect logic. Thus, after sending a BTM response that accepts a transition recommendation, a station may determine that the new (recommended) access point is not the correct one for the station. Moreover, when a station moves to new access point, it should not get steered again. Otherwise, the station may be repeatedly transitioned or ping ponged among multiple access points.

In order to address these problems, in some embodiments the access point (or a controller or a management system for the access point) may maintain information about previous transition cycles, such as a steering request failure. Then, if a count of declined recommendations exceeds two (a configurable value) times, the access point may send an IEEE 802.11v BTM request with a disassociation imminent bit set to '1.' Alternatively or additionally, if the count of declined recommendations exceeds three (a configurable value), then the access point may not provide a transition recommendation to the station for a dwell time of 600 s (a configurable value). Furthermore, in order to reduce or eliminate ping ponging of a station, the access point may perform the following operations. Notably, if a station disassociates from an access point or is out of wireless range because of steering, then the access point may send a broadcast notification to the neighboring access point querying whether this station is connected to any of them. One of the neighboring access points, which is connected to the station, may respond to this query (e.g., using wired communication, which may be compatible with Ethernet). After receiving this response, the previously connected access point may pass information about the station, such as its MAC address, channel, etc., to the newly connected access point. This information may be used by the newly connected access point to prevent the station from getting shortlisted to quickly or frequently.

The exchanged information may also be used to track the movement of the station between access points in an environment. This data may facilitate analysis that tracks the stations or to identify a rogue station that is connecting to multiple access points (or is attempting to connect to multiple access points) for an illicit purpose, such as to perform a rogue activity.

In some embodiments, the exchanged information between or among access points may include: a MAC address of a station, a BTM success rate of the station, a beacon report success rate of the station, a station scan success rate, and/or timing (such as a timestamp) or a previous steering or transition recommendation.

We now describe embodiments of an electronic device, which may perform at least some of the operations in the communication technique. FIG. 10 presents a block diagram illustrating an example of an electronic device 1000 in accordance with some embodiments, such as one of access points 110 or electronic devices 112. This electronic device includes processing subsystem 1010, memory subsystem 1012, and networking subsystem 1014. Processing subsystem 1010 includes one or more devices configured to perform computational operations. For example, processing subsystem 1010 can include one or more microprocessors, ASICs, microcontrollers, programmable-logic devices, one or more graphics process units (GPUs) and/or one or more digital signal processors (DSPs).

Memory subsystem 1012 includes one or more devices for storing data and/or instructions for processing subsystem 1010 and networking subsystem 1014. For example, memory subsystem 1012 can include dynamic random access memory (DRAM), static random access memory (SRAM), and/or other types of memory. In some embodiments, instructions for processing subsystem 1010 in memory subsystem 1012 include: one or more program modules or sets of instructions (such as program instructions 1022 or operating system 1024), which may be executed by processing subsystem 1010. Note that the one or more computer programs may constitute a computer-program mechanism. Moreover, instructions in the various modules in memory subsystem 1012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1010.

In addition, memory subsystem 1012 can include mechanisms for controlling access to the memory. In some embodiments, memory subsystem 1012 includes a memory hierarchy that comprises one or more caches coupled to a memory in electronic device 1000. In some of these embodiments, one or more of the caches is located in processing subsystem 1010.

In some embodiments, memory subsystem 1012 is coupled to one or more high-capacity mass-storage devices (not shown). For example, memory subsystem 1012 can be coupled to a magnetic or optical drive, a solid-state drive, or another type of mass-storage device. In these embodiments, memory subsystem 1012 can be used by electronic device 1000 as fast-access storage for often-used data, while the mass-storage device is used to store less frequently used data.

Networking subsystem 1014 includes one or more devices configured to couple to and communicate on a wired and/or wireless network (i.e., to perform network operations), including: control logic 1016, an interface circuit 1018 and one or more antennas 1020 (or antenna elements). (While FIG. 10 includes one or more antennas 1020, in some embodiments electronic device 1000 includes one or more nodes, such as nodes 1008, e.g., a network node that can be coupled or connected to a network or link, or an antenna node or a pad that can be coupled to the one or more antennas 1020. Thus, electronic device 1000 may or may not include the one or more antennas 1020.) For example, networking subsystem 1014 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 1000 may be adapted or changed using pattern shapers (such as reflectors) in one or more antennas 1020 (or antenna elements), which can be independently and selectively electrically coupled to ground to steer the transmit antenna pattern in different directions. Thus, if one or more antennas 1020 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1000 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1014 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1000 may use the mechanisms in networking subsystem 1014 for performing simple wireless communication between the electronic devices, e.g., transmitting advertising or beacon frames and/or scanning for advertising frames transmitted by other electronic devices as described previously.

Within electronic device 1000, processing subsystem 1010, memory subsystem 1012, and networking subsystem 1014 are coupled together using bus 1028. Bus 1028 may include an electrical, optical, and/or electro-optical connection that the subsystems can use to communicate commands and data among one another. Although only one bus 1028 is shown for clarity, different embodiments can include a different number or configuration of electrical, optical, and/or electro-optical connections among the subsystems.

In some embodiments, electronic device 1000 includes a display subsystem 1026 for displaying information on a display, which may include a display driver and the display, such as a liquid-crystal display, a multi-touch touchscreen, etc.

Electronic device 1000 can be (or can be included in) any electronic device with at least one network interface. For example, electronic device 1000 can be (or can be included in): a desktop computer, a laptop computer, a subnotebook/ netbook, server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 1000, in alternative embodiments, different components and/or subsystems may be present in electronic device 1000. For example, electronic device 1000 may include one or more additional processing subsystems, memory subsystems, networking subsystems, and/or display subsystems. Additionally, one or more of the subsystems may not be present in electronic device 1000. Moreover, in some embodiments, electronic device 1000 may include one or more additional subsystems that are not shown in FIG. 10. Also, although separate subsystems are shown in FIG. 10, in some embodiments some or all of a given subsystem or component can be integrated into one or more of the other subsystems or component(s) in electronic device 1000. For example, in some embodiments program instructions 1022 are included in operating system 1024 and/or control logic 1016 is included in interface circuit 1018. In some embodiments, the communication technique is implemented using information in layer 2 and/or layer 3 of the Open System Interconnection model.

Moreover, the circuits and components in electronic device 1000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a communication circuit) may implement some or all of the functionality of networking subsystem 1014 (or more generally, of electronic device 1000). The integrated circuit may include hardware and/or software mechanisms that are used for transmitting wireless signals from electronic device 1000 and receiving signals at electronic device 1000 from other electronic devices. Aside from the mechanisms herein described, radios are generally known in the art and hence are not described in detail. In general, networking subsystem 1014 and/or the integrated circuit can include any number of radios. Note that the radios in multiple-radio embodiments function in a similar way to the described single-radio embodiments.

In some embodiments, networking subsystem 1014 and/ or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 1022, operating system 1024 (such as a driver for interface circuit 1018) or in firmware in interface circuit 1018. Alternatively or additionally, at least some of the operations in the communication technique may be implemented in a physical layer, such as hardware in interface circuit 1018.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
an interface circuit configured to communicate via wireless communication with one or more electronic devices in a wireless local area network (WLAN) and to communicate via wired communication or wireless communication with one or more second access points in the WLAN, wherein the access point is configured to:
identify at least the first connected electronic device based at least in part on: one or more communication performance metrics associated with at least a subset of the one or more electronic devices; or information included in a packet or frame associated with the first connected electronic device;
determine a weight corresponding to the history of responses; and
selectively provide, addressed to the first connected electronic device, a recommendation based at least in part on: the weight, a history of responses of at least the first connected electronic device to one or more previous recommendations, a communication performance metric of the access point and communication performance metrics of the one or more second access points, wherein the recommendation indicates that the first connected electronic device, which is associated with the access point, transition to a different communication channel;
wherein the history of responses comprises information specifying whether the first connected electronic device accepted, declined or both a previous recommendation in the one or more previous recommendations;
wherein, when the weight is less than a first threshold, the recommendation is selectively provided;
wherein, when the weight is greater than the first threshold and less than a second threshold, the recommendation is selectively provided along with a warning to encourage acceptance of the recommendation; and
wherein, when the weight is greater than the second threshold, the access point disassociates from the first connected electronic device instead of providing the recommendation.

2. The access point of claim 1, wherein the selective providing is based at least in part on a parameter corresponding to the communication performance metrics of the one or more second access points.

3. The access point of claim 2, wherein the parameter comprises a headroom value plus a moment of a distribution of the communication performance metrics of the one or more second access points.

4. The access point of claim 1, wherein the different communication channel is associated with access point or one of the one or more second access points.

5. The access point of claim 1, wherein the recommendation is selectively provided using a basic service set transition management (BTM) protocol; and wherein, when the first connected electronic device does not support the BTM protocol, the access point is configured to disassociate from the first connected electronic device.

6. The access point of claim 1, wherein the access point is configured to:
communicate, addressed to or associated with the one or more electronic devices, one or more packets or frames;
determine, based at least on the communicated one or more packets or frames, the communication performance metric of the access point; and
receive, associated with the one or more second access points, one or more second messages, wherein the one or more second messages comprise the communication performance metrics of the one or more second access points.

7. The access point of claim 1, wherein the communication performance metric of the access point or a given one of the communication performance metrics of the one or more second access points comprise an available capacity.

8. The access point of claim 1, wherein the weight increases as a number of times the first connected electronic device declined the one or more previous recommendations increases.

9. The access point of claim 1, wherein the weight is based at least in part on at least one of: a data rate or throughput associated with the first connected electronic device, a traffic demand associated with the first connected electronic device, or a signal-to-noise ratio or a signal strength associated with the first connected electronic device.

10. The access point of claim 1, wherein the selective providing of the recommendation is based at least in part on an elapsed time since the first connected electronic device transitioned from a second access point in the one or more second access points.

11. The access point of claim 10, wherein the access point is configured to:
provide, addressed to the second access point, information that indicates that the access point is associated with the first connected electronic device; and
receive, associated with the second access point, a notification that indicates a timestamp when the first connected electronic device transitioned from the second access point.

12. The access point of claim 10, wherein, when the elapsed time is less than a time interval, the access point does not provide the recommendation.

13. The access point of claim 1, wherein the access point is configured to store information that specifies the identity of the first connected electronic device with the history of responses of the first connected electronic device.

14. The access point of claim 1, wherein the access point is configured, prior to selectively providing the recommendation, to:
provide, addressed to the one or more electronic devices, requests for beacon reports;
receive, associated with at least a subset of the one or more electronic devices, the beacon reports; and
wherein the selective providing of the recommendation is based at least in part on the beacon reports.

15. A non-transitory computer-readable storage medium for use in conjunction with an access point, the computer-readable storage medium storing program instructions that, when executed by the access point, causes the access point to perform operations comprising:
identifying at least a first connected electronic device based at least in part on: one or more communication performance metrics associated with at least a subset of one or more electronic devices; or information included in a packet or frame associated with the first connected electronic device;
determining a weight corresponding to the history of responses; and
selectively providing, addressed to the first connected electronic device, a recommendation based at least in part on: a history of responses of at least the first connected electronic device to one or more previous recommendations, a communication performance metric of the access point and communication performance metrics of one or more second access points, wherein the recommendation indicates that the first connected electronic device, which is associated with the access point, transition to a different communication channel;
wherein the history of responses comprises information specifying whether the first connected electronic device accepted, declined or both a previous recommendation in the one or more previous recommendations;
wherein, when the weight is less than a first threshold, the recommendation is selectively provided;
wherein, when the weight is greater than the first threshold and less than a second threshold, the recommendation is selectively provided along with a warning to encourage acceptance of the recommendation; and
wherein, when the weight is greater than the second threshold, the access point disassociates from the first connected electronic device instead of providing the recommendation.

16. The non-transitory computer-readable storage medium of claim 15, wherein the operations comprise
communicating, addressed to or associated with the one or more electronic devices, one or more packets or frames;
determining, based at least on the communicated one or more packets or frames, the communication performance metric of the access point; and
receiving, associated with the one or more second access points, one or more second messages, wherein the one or more second messages comprise the communication performance metrics of the one or more second access points.

17. A method for selectively providing a recommendation, comprising:
by an access point:
identifying at least a first connected electronic device based at least in part on: one or more communication performance metrics associated with at least a subset of one or more electronic devices; or information included in a packet or frame associated with the first connected electronic device;
determining a weight corresponding to the history of responses; and
selectively providing, addressed to the first connected electronic device, the recommendation based at least in part on: a history of responses of at least the first connected electronic device to one or more previous recommendations, a communication performance metric of the access point and communication performance metrics of one or more second access points, wherein the recommendation indicates that the first connected electronic device, which is associated with the access point, transition to a different communication channel; and
wherein the history of responses comprises information specifying whether the first connected electronic device accepted, declined or both a previous recommendation in the one or more previous recommendations;

wherein, when the weight is less than a first threshold, the recommendation is selectively provided;

wherein, when the weight is greater than the first threshold and less than a second threshold, the recommendation is selectively provided along with a warning to encourage acceptance of the recommendation; and wherein, when the weight is greater than the second threshold, the access point disassociates from the first connected electronic device instead of providing the recommendation.

18. The method of claim 17, wherein the method comprises:

communicating, addressed to or associated with the one or more electronic devices, one or more packets or frames;

determining, based at least on the communicated one or more packets or frames, the communication performance metric of the access point; and receiving, associated with the one or more second access points, one or more second messages, wherein the one or more second messages comprise the communication performance metrics of the one or more second access points.

19. The method of claim 17, wherein the different communication channel is associated with access point or one of the one or more second access points.

20. The method of claim 17, wherein the recommendation is selectively provided using a basic service set transition management (BTM) protocol; and wherein, when the first connected electronic device does not support the BTM protocol, the method comprises disassociating from the first connected electronic device.

* * * * *